Oct. 7, 1969    A. LANGNER ET AL    3,470,635
APPARATUS FOR CONTROLLING THE OUTPUT OF DREDGING, LOADING
AND UNLOADING IMPLEMENTS
Filed Dec. 14, 1966    11 Sheets-Sheet 1

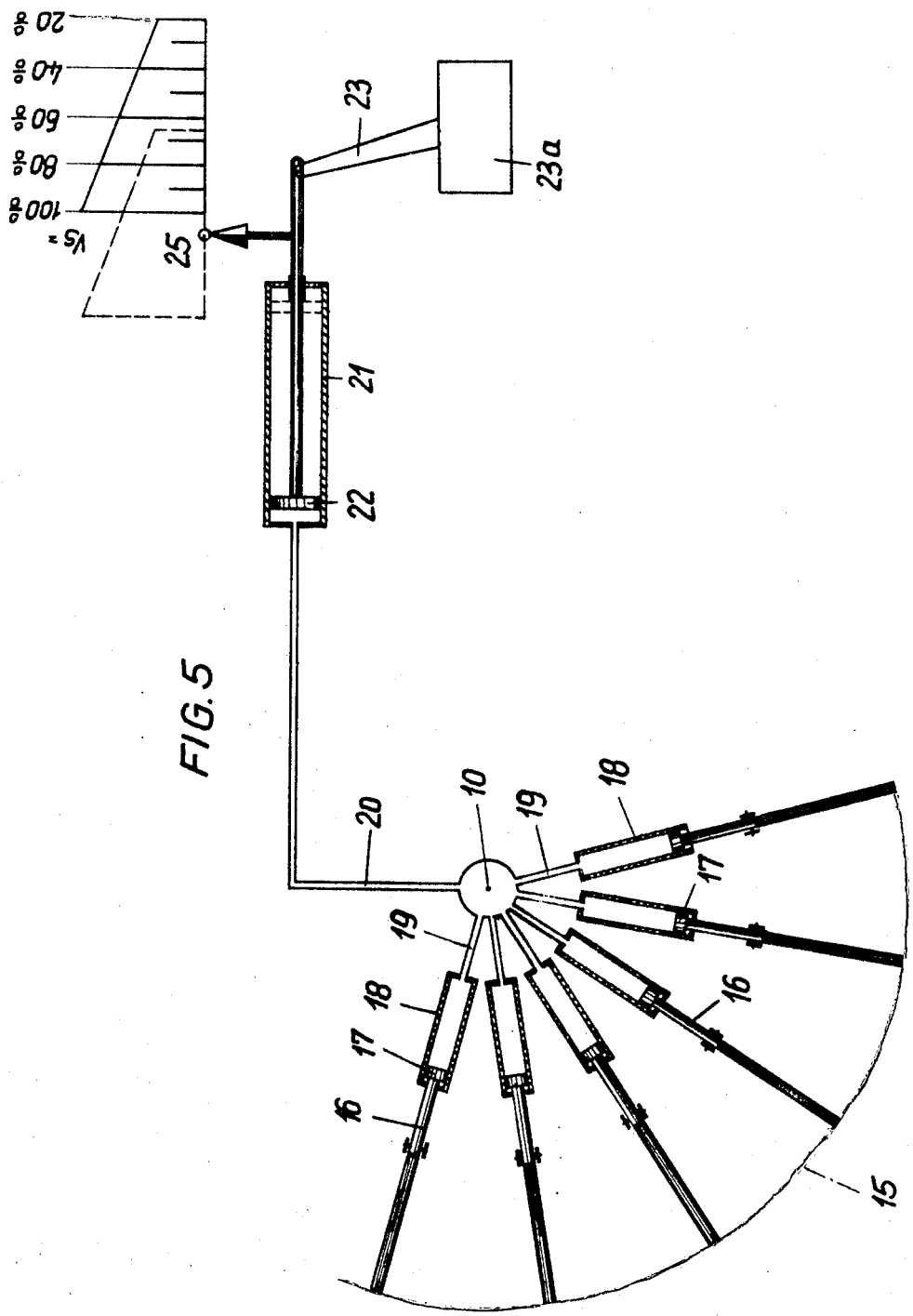

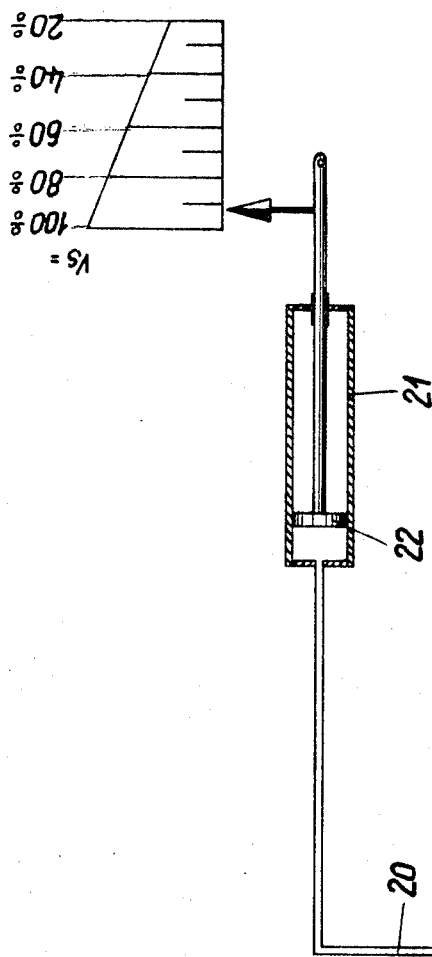
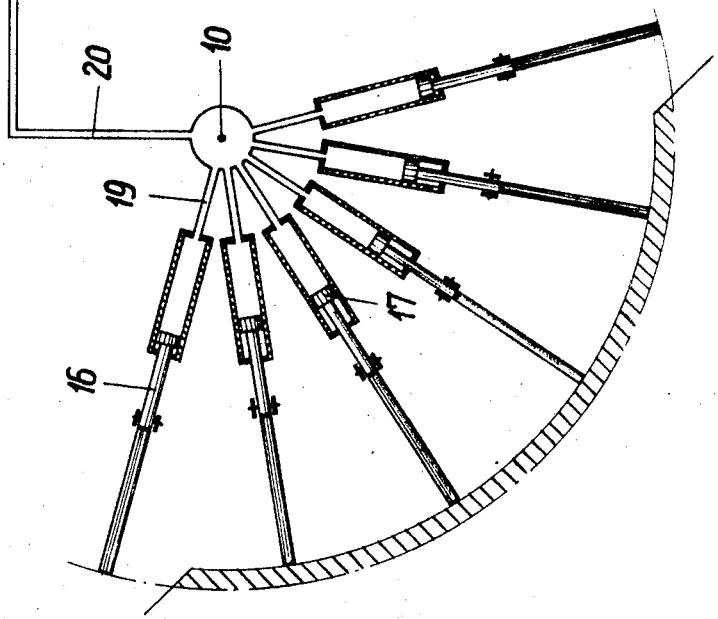
FIG. 6

United States Patent Office 3,470,635
Patented Oct. 7, 1969

3,470,635
APPARATUS FOR CONTROLLING THE OUTPUT OF DREDGING, LOADING AND UNLOADING IMPLEMENTS
Alexander Langner and Raimonds Sukurs, Rheinhausen, Germany, assignors to Fried. Krupp Gesellschaft mit beschrankter, Haftung
Filed Dec. 14, 1966, Ser. No. 601,626
Claims priority, application Germany, Dec. 17, 1965, B 85,014
Int. Cl. E02f 3/24, 9/00
U.S. Cl. 37—190                    9 Claims

ABSTRACT OF THE DISCLOSURE

Material handling apparatus having scanning means adjustable selectively for varying the rate of loading and unloading of material goods and supported to move ahead of the handling apparatus in probing the contour of the slope of a mass of material goods sufficient to assure constant and uniform output supply of material goods. A control means for the material handling apparatus is operable in response to deviation of the slope contour probed by said scanning means resulting in variation in speed of the handling movement to assure compensation in the handling operation for maintaining a constant and uniform output supply of material goods. Sensing signals due to probing of the slope of the mass of material goods are utilized for variable speed to and fro movement along the axis of a material cutting circle defined by a bucket wheel, the variable speed being effected by the control means.

---

When operating continuously working dredges and loaders, especially bucket wheel implements, it is necessary for purposes of realizing an economic operation, that the implement operates as far as possible continuously with an as uniform as possible maximum output so that the capacity of the implement can be utilized to the fullest extent and that the conveyor installation following said implement will convey a maximum quantity of material or movable goods per time unit. Generally, however, it is rather difficult to realize this goal because of irregularities in the terrain to be dredged and irregularities in the mass of material to be picked up by the loader which interfere with the above mentioned goal.

For purposes of a better understanding of the above mentioned problems and the problems underlying the present invention, reference may be had to the accompanying FIGURES 1 and 2. FIG. 1 indicates which factors in a bucket loading implement determine the output, i.e. the quantity of goods picked up per time unit. In this connection it may be assumed that a bucket wheel after having operated with the cutting circle illustrated in dot-dash lines in FIG. 1 has been displaced in a horizontal direction toward the slope from which the goods are to be picked up, by a distance S, i.e. the cutting depth. The bucket wheel will operate by simultaneously rotating and advancing in the direction of its axis with the speed $v$. Consequently, the bucket wheel will within the time $t$ perform a stroke $1=v\times t$ and from the slope will cut out a body having the length 1 and having a crescent-shaped profile surface F. This surface equals the product of the height $h$ of the cutout and the depth S of the cutout. The quantity of material picked up per time unit will then be $Q=F\times v$. The advance of the bucket wheel at the speed $v$ is, in the so-called bank operation, rectilinear because in this instance the implement moves at a speed $v$ along the slope. In the so-called block operation as it is diagrammatically illustrated in FIG. 2 in top view, the bucket wheel boom 1 is pivoted about the vertical axis 2 while the implement is at a standstill so that the bucket wheel axis moves along an arc. The speed $v$ is thus tangential to this arc.

In practice, the surface F is not constant along the path described by the bucket wheel which fact is due to irregularities of the slope to be worked. If during the advance of the bucket wheel it is desired to maintain the conveyed output Q constant in spite of the irregularities of the surface F, it is necessary to change the speed $v$ at the inverse ratio.

The dredge operator will try to effect the required changes in the advancing speed $v$ by controlling the drive for the dredge or for the pivoting of the bucket wheel boom. In this attempt he has more or less to rely on an imperfect observation of the cutting conditions on the bucket wheel and thus on a rather coarse estimate. It is obvious that in this way the output cannot be held constant to the desired extent.

The German periodical "Braunkohle," 1940, on pages 184 et seq., suggests block operation automatically to control the speed of pivoting the bucket wheel boom so that the lowest pivoting speed $v_{min}$ will be obtained when the boom is located in the direction of its starting position and the pivoting speed is controlled in conformity with the function $v=1/\text{cosine}\times v_{min}$. However, in this way the pivoting speed is merely adapted to the crescent shape of the block cut as shown in FIG. 2 while the irregularities of the terrain to be dredged are not taken into consideration.

German Patent 974,336 suggests in connection with the boom pivoting speed of a bucket wheel dredge working in block operation to maintian the dredge output constant by providing an automatic control device which is responsive to the conveyor output as ascertained for instance by means of a belt scale below one of the conveyor belts. This control, however, operates with a delay in view of the distance between the belt scale and the bucket wheel so that variations in the conveyor output from a mean value cannot be avoided.

It is, therefore, an object of the present invention to provide a bucket implement which will overcome the above mentioned drawbacks.

It is another object of this invention to provide a bucket implement which can be so controlled that at high precision, automatically an optimum conveying output will be maintained.

These and other objects and advantages of the invention will appear more clearly from the following specification in connection with the accompanying drawings, in which FIGURES 1, 2 are diagrams and 3 to 11 illustrate an embodiment of a bucket implement according to the present invention. More specifically, FIGURES 1 and 2 diagrammatically illustrate factors affecting operation of a bucket wheel implement.

FIGS. 5 to 10 diagrammatically illustrate a feeler device at different adjustable settings.

Figure 11:
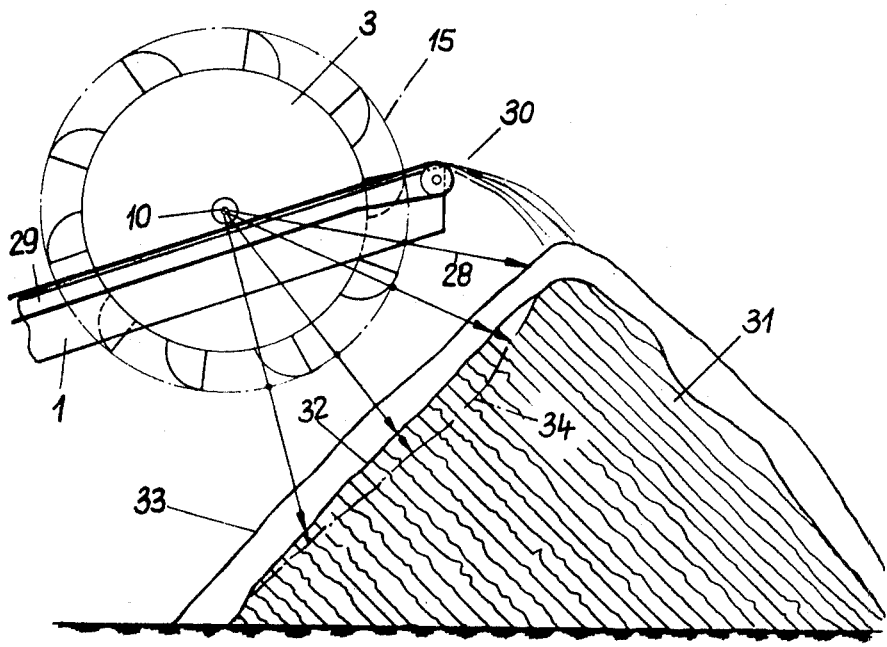

FIG. 11 shows the head of a combined pick-up and unloading device in side view with a cross section through a pile of pourable goods.

The present invention is based on a device for controlling the output of a dredging, digging, or unloading implement of which the pick-up or unloading means are moved along the slope of the material to be picked-up or of the material which has been unloaded. The invention consists primarily in that the difference between the slope profile as ascertained at a certain point by a feeling device moving ahead of the implement and the slope profile to be created by said implement at the same point of the slope profile determines the impulse for an adjusting device which controls the advancing speed of the implement.

For purposes of controlling the output of a bucket wheel dredge or bucket wheel loader, the feeling device is advantageously so designed that it ascertains the respective cross section of the cut. For instance, the feeling device has arms adapted to carry out a pendulum-like movement and depending on the slope profile, these arms are adapted to tilt in a direction opposite to the advancing direction of the implement while the amplitude displacement or deflection of said arms furnishes the impulses for the adjusting device. However, it is also possible, for purposes of ascertaining the distance with respect to a point which is fixed relative to the implement, from points of the respective section of the slope profile, to equip the feeling device with emitters and receivers known per se for radiating rays of the material or non-material type or to equip the feeling device with one such emitter and receiver. To this end, for as many points of the slope profile section as possible there is provided a separate emitter and/or receiver so that bearings can be obtained simultaneously from all of these points. However, this feeling device may also be so designed that all points of the slope profile section are successively scanned by a beam or by beams while employing at least one movable emitter and/or receiver. In this way, a complete continuous scanning of the slope profile section will be realized with a minimum of emitters and receivers.

At any rate, the values ascertained by the feeling or scanning device are so integrated that a value will be obtained which precisely corresponds to the scanned profile section. On this basis, the impulse can be created which corresponds to the difference between the scanned slope profile and the slope profile to be produced by the implement. This means that when a bucket wheel implement is involved, an impulse is formed which corresponds to the cross section F of the cut. With the combined pick-up and unloading implement, the scanning device is advantageously reversible in such a way that it can be employed selectively for the pick-up operation and for the unloading operation. With a bucket wheel loader this can be effected in such a way that the range of the scanning device, when shifting from pick-up operation to unloading operation, is increased beyond the cutting circle of the bucket wheel accordingly steps are taken when shifting from unloading to pick-up operation, so that the scanning device will cause the emission of impulses only after reduction of the range corresponding to the surface of the cut.

Figure 3:
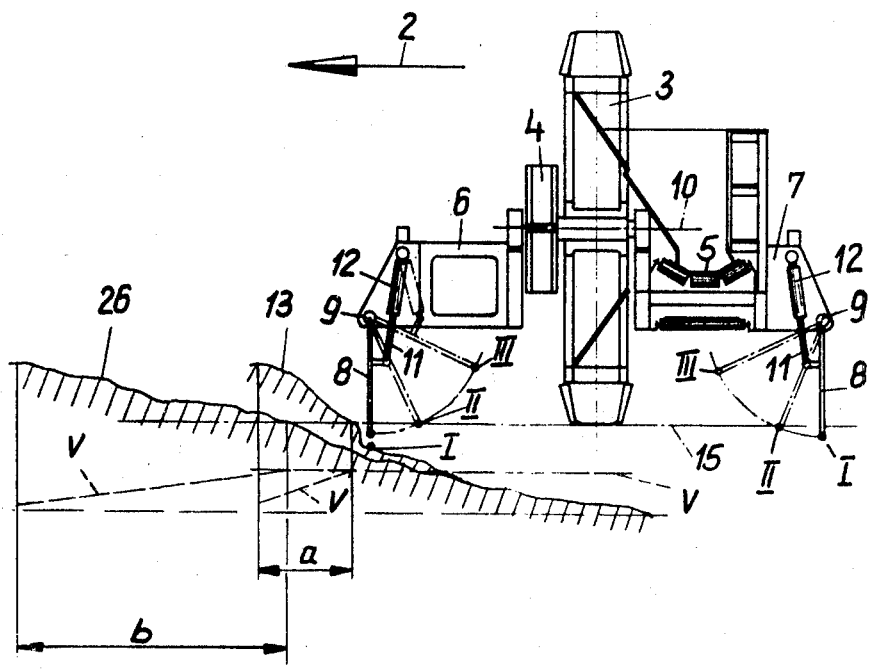
FIG. 3 is an end view of the bucket wheel head of a bucket wheel loader according to the invention with a cut through the pile to be picked up.
Figure 4:
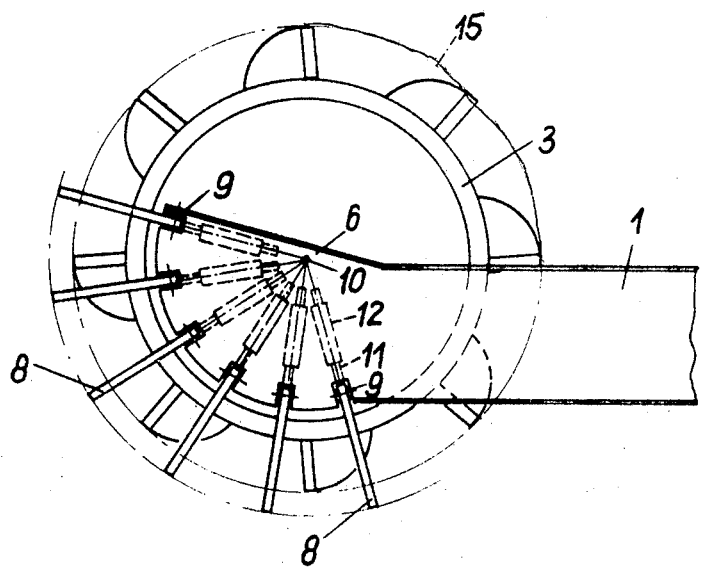
FIG. 4 is a side view of the feeler device pertaining to the bucket wheel loader of FIG. 3.

Referring now to the drawings in detail, it may be assumed that the bucket wheel loader shown in FIGS. 3 and 4 operates in block operation. In other words, the bucket wheel boom 1 is pivoted in the direction of the arrow 2. However, it should also be noted that the output control according to the present invention is principally the same when the implement works in bank operation, i.e. when the implement is moved along the slope of the material to be removed without oscillating the bucket wheel boom. On one side of the bucket wheel 3 there is a drive 4, whereas on the other side there is provided the bucket wheel boom belt 5.

On both sides of the bucket wheel 3 in considerable spaced relationship to each other there are provided two feeling or scanning devices which are supported by frames 6 and 7 mounted on the bottom 1. Each feeling device comprises primarily a plurality of arms 8 adapted to carry out a pendulum-like movement. These arms are suspended in joints 9 on frame 6, 7 respectively, the centers of said joints 9 being located on an arc which is concentrically arranged with regard to the bucket wheel turning axis 10. In the illustrated starting position, the centers of the arms 8 are located in a plane to which the direction of the boom oscillating movement as indicated by the arrow 2 is perpendicular. The central lines of arms 8 intersect the bucket wheel axis 10 as shown in FIG. 4. Each arm 8 has linked thereto a piston rod 11, the pistons of which are guided in cylinders 12 respectively mounted on frames 6 and 7. When oscillating arms 8 in the direction toward the bucket wheel 3, the cylinders 12 displace fluid, and the total displaced fluid acts upon a hydraulic control for influencing the bucket wheel boom.

It may be assumed that the mass of material or movable goods in the vertical plane coinciding with the axis 10 of the bucket wheel, has a profile 13. When the boom is pivoted in the direction of the arrow 2 and the arms 8 hit the mass of bulk material or movable goods, the said arms are pivoted toward the bucket wheel 3.

Under the conditions assumed in conformity with the showing of FIG. 3, the point I, at which the profile line 13 intersects the vertical plane corresponding to the starting position of the arms 8, is located outside the cutting circle 15 of the bucket wheel. It is assumed that point I is located outside the reach of the respective arms 8 which means that the respective arm 8 has not been moved out of its starting position. The feeling or scanning device is so designed that, with a bucket wheel loader the arms 8 initiate impulses only when, while hitting the pile of pourable goods, they are pivoted to such an extent that their end points are located on or within the cutting circle 15 (point II). The end point of an arm 8 at a maximum amplitude thereof is in FIG. 3 designated with the number III. The impulses initiated by the arms 8 will be stronger in corresponding relation to further the arms 8 have been pivoted between the limit positions II and III, in other words, in accordance with the further the scanned section of the slope profile extends into the cutting circle 15 of the bucket wheel. All impulses which are simultaneously initiated by the arms 8 are integrated in a suitable manner, for instance hydraulically, and on the basis thereof in a suitable device there is formed a resultant impulse which corresponds to the respective difference between the slope profile section and the bucket wheel cutting circle 15, i.e. to the cross section F of the cut.

FIGS. 5 to 10 illustrate how the pivoting speed $v$ of the bucket wheel boom can be controlled in this manner. For purposes of simplicity it is assumed that the scanning device has feelers 16 instead of arms 8 which can be displaced with regard to the bucket wheel axis 10. These feelers 16 are provided on pistons 17 guided in hydraulic cylinders 18. All cylinders 18 within the range of the bucket wheel axis 10 are connected through conduits 19 to a conduit 20 which leads to a hydraulic cylinder 21 of the adjusting device. Reciprocably mounted in cylinder 21 is a piston 22, the piston rod of which is adapted by means of an adjusting member 23 to actuate a control device 23a for the pivoting motor 23b. FIGS. 5 to 9 illustrate by way of diagrams which pivoting speed $v$ is to be controlled in the various positions of piston 22 and adjusting member 23, see also FIG. 5a.

Figure 1:
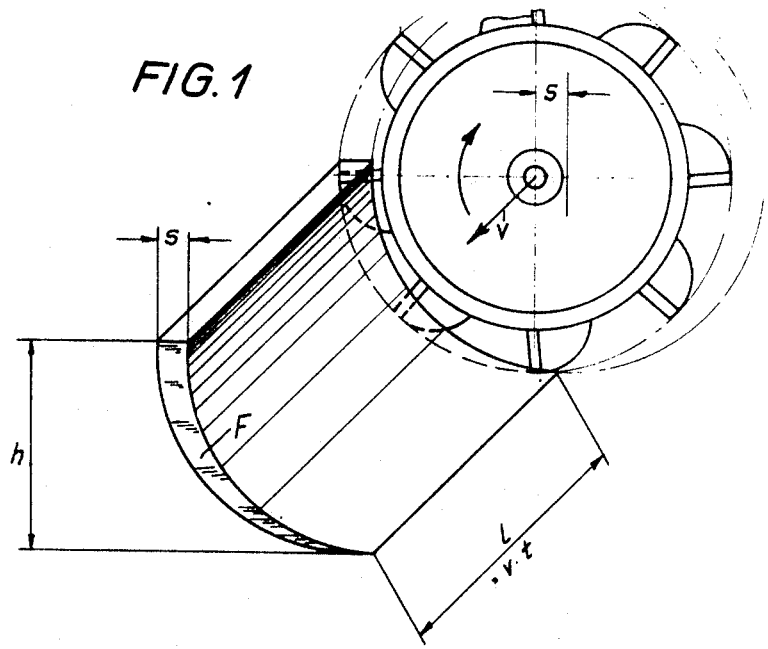
Figure 2:
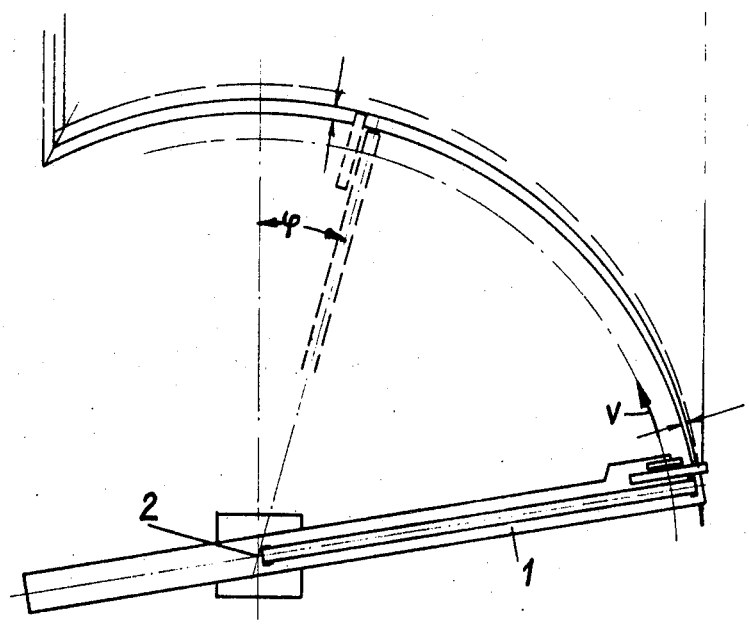
Figure 5A:
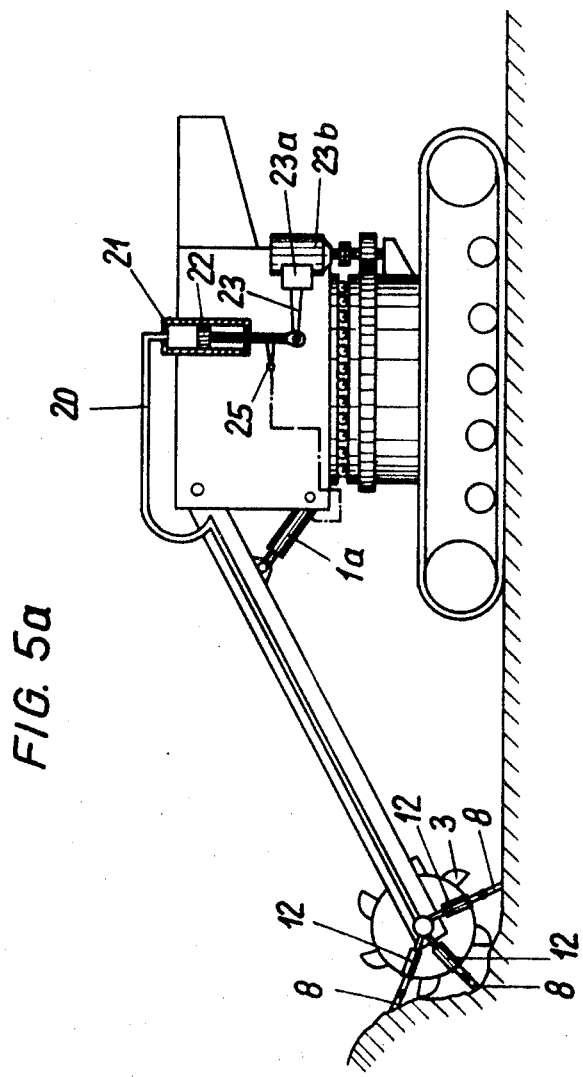
Figure 7:
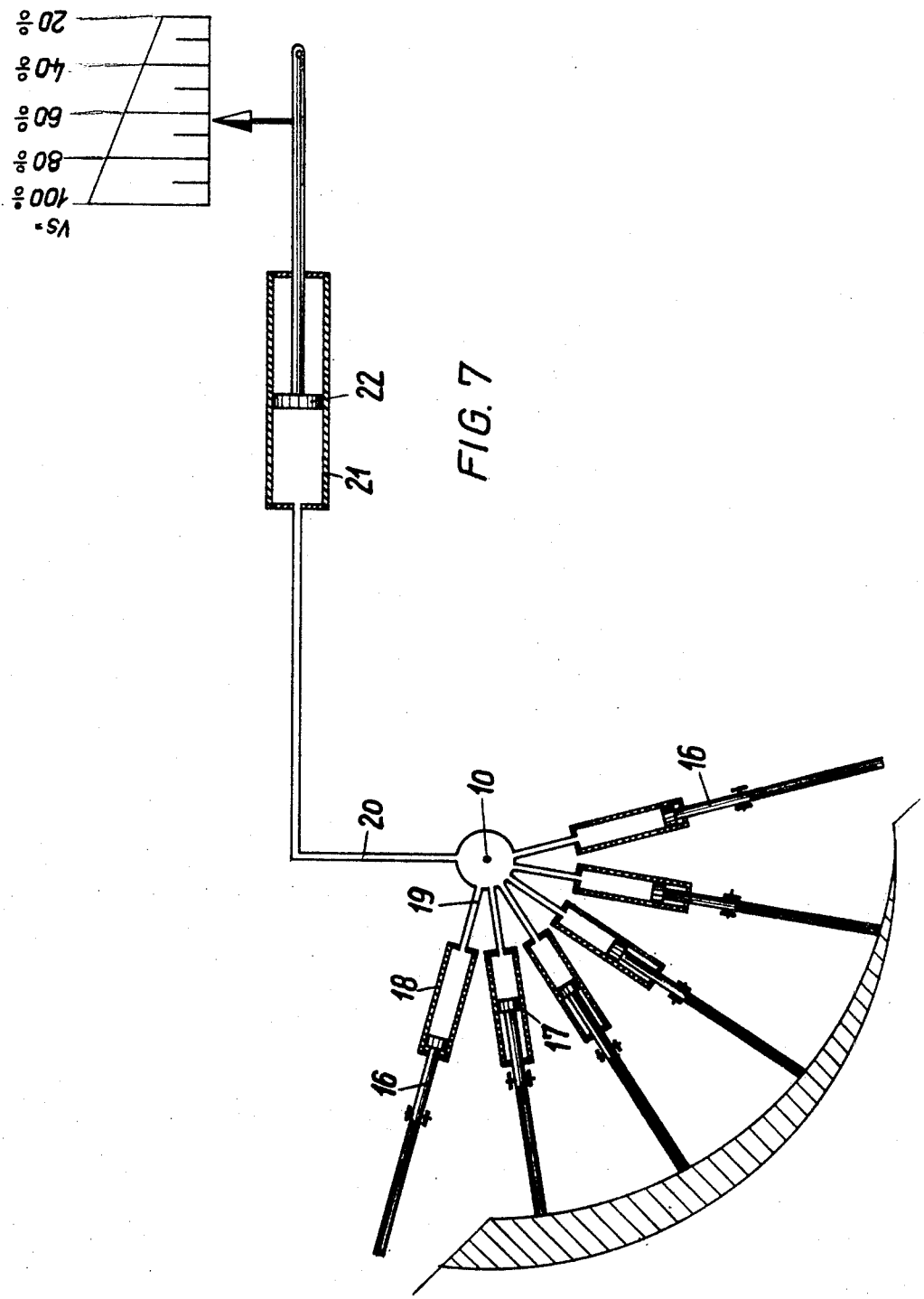
Figure 8:
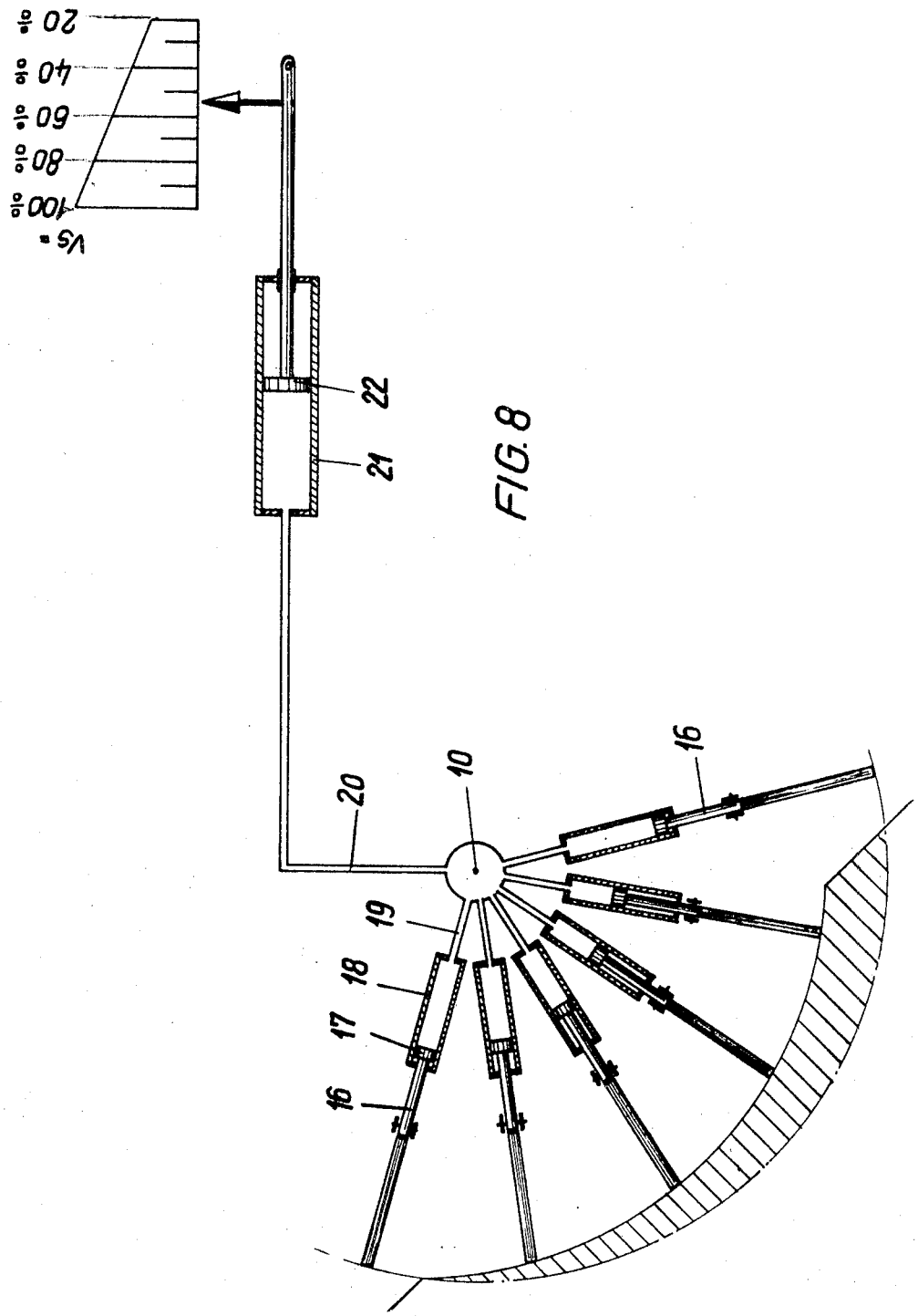
Figure 9:
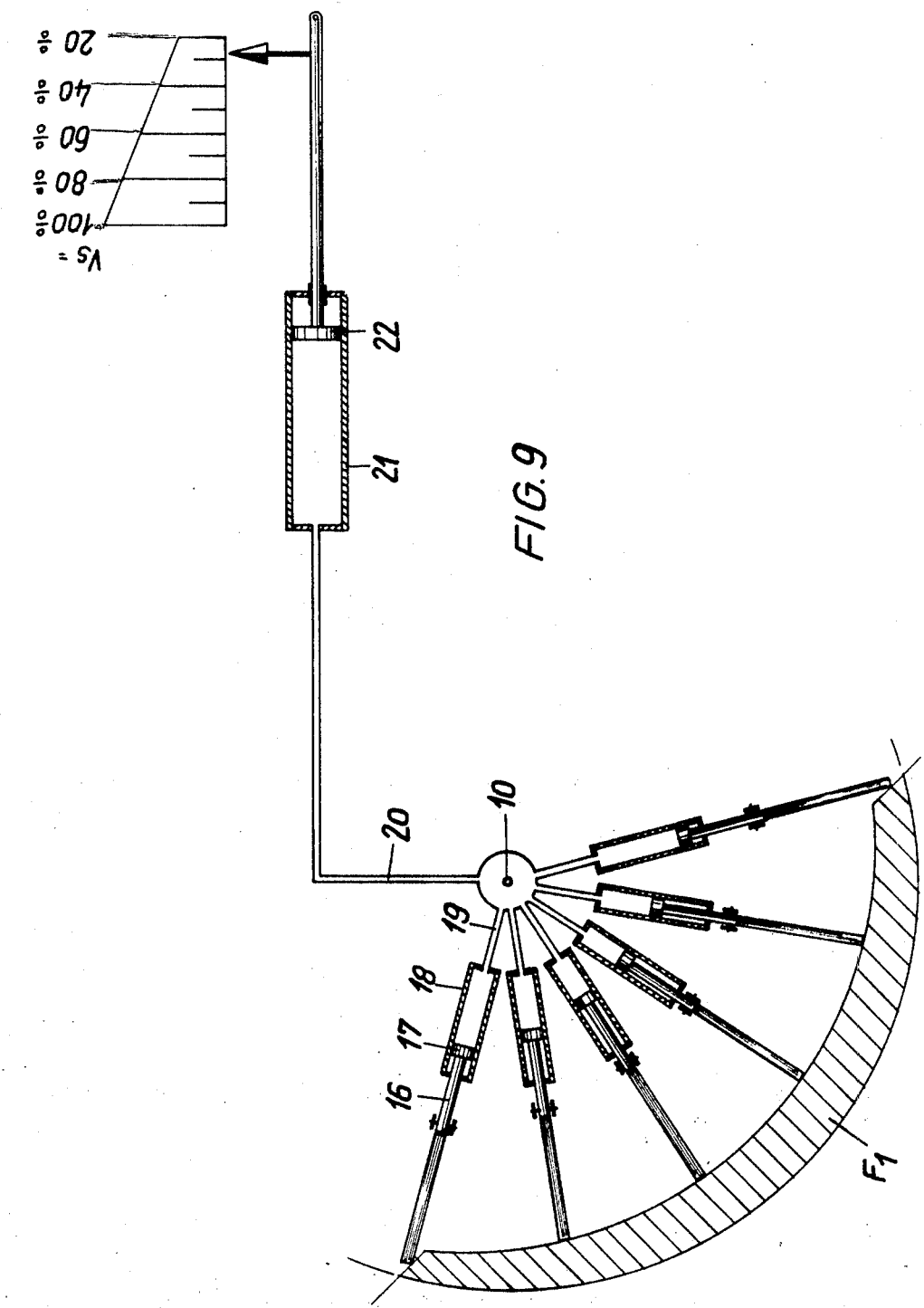
Figure 10:
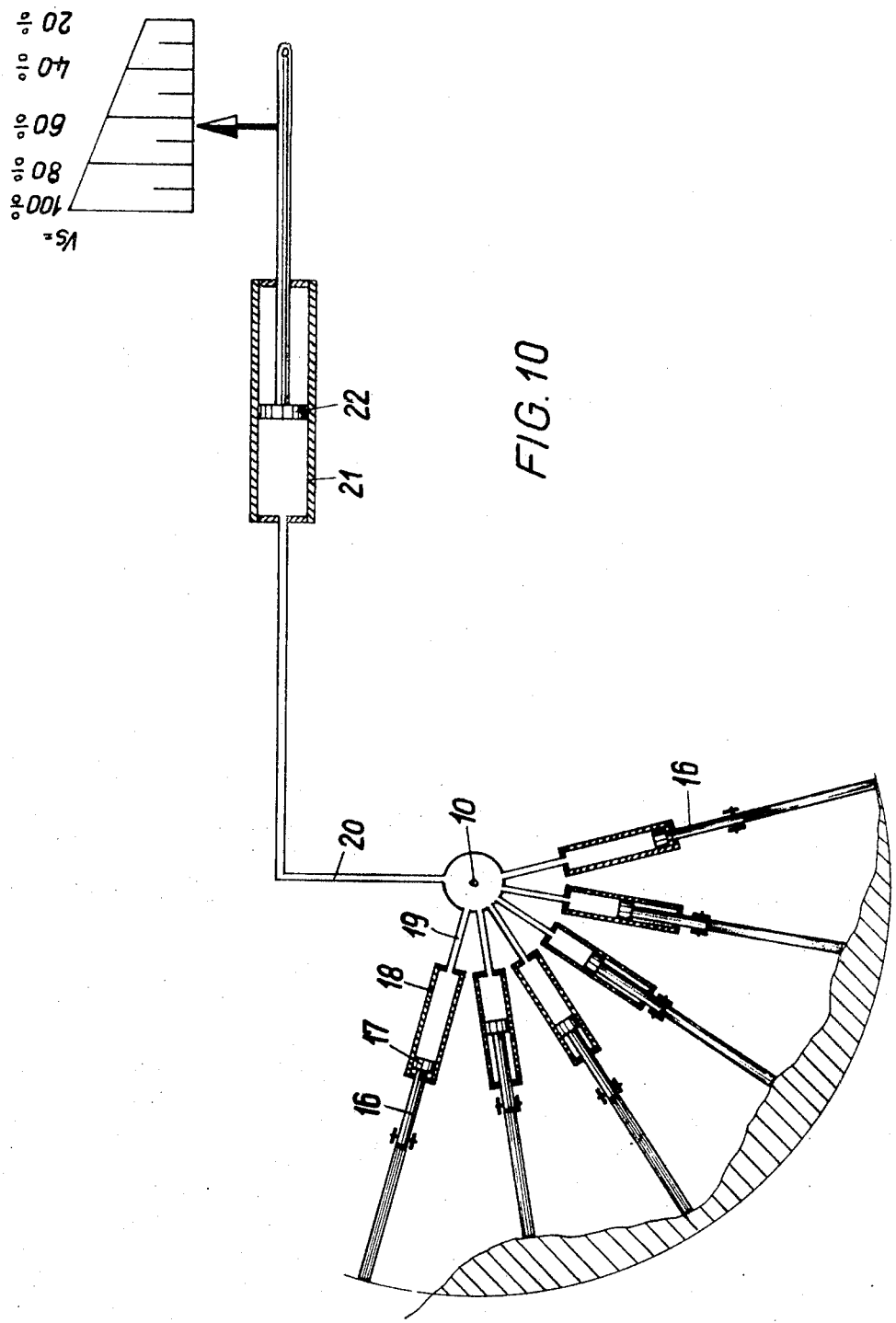

According to FIG. 5, the feelers 16 are moved out as far as possible, and their ends are located on the cutting circle 15 of the bucket wheel. Accordingly, piston 22 occupies its outermost left-hand position and the control member 23 is moved beyond the adjustment which corresponds to a pivoting speed of 100%. This position is, for instance, obtained when during block operation the bucket wheel boom forms a right angle with the direction of displacement, in other words, the angle $\varphi$ of FIG. 2 equals 90°. In this instance the cross section F of the cut equals zero. In such an instance it would be necessary, for maintaining the previously determined quantity Q of the goods to be conveyed, that the pivoting speed $v$ becomes infinitely high. Since this cannot be realized, in practice the bucket wheel boom is not permitted with all cuts to pivot to an angle of 90° as indicated in FIG. 2. However, inasmuch as in such an instance at the end of the crescent-shaped cross section according to FIG. 2 the cross section F of the cut becomes very small and the pivot speed can practically not be increased in the reverse ratio, it is advantageous, for purposes of holding the conveyed output constant, to increase the cross section of the cut in a different way, for instance by lowering the bucket wheel or by moving the boom outwardly for purposes of increasing the depth S of the cut. The corresponding control is effected in conformity with FIG. 5, for instance, through the intervention of a contact 25 with the illustrated adjustment of the control member 23. The lowering of the bucket wheel may be performed by the hydraulic device 1a in FIG. 5a.

However, when the feelers 16 are to a more or less extent moved into the range within the cutting circle 15, as shown in FIGS. 6 to 10 for different cuts, the pivoting speed v will in conformity with the respective positions of the adjusting member 23 be so controlled that the conveyor output Q remains constant. The magnitude of the cross section F of the cut depends on the pivoting position of the bucket wheel boom and on the thickness of the cut pertaining thereto of the cross section of the crescent. The magnitude of the cross section F of the cut furthermore depends on the initial adjustment of the cut and also on the irregularities to which the slope profile section is subjected so that automatically all factors affecting the conveyor output will be taken into consideration.

In this connection it is important that the feeling device will during the pivoting of the boom run ahead of the bucket wheel. Consequently, the time required by the bucket wheel 3 to reach the feeling point is used advantageously for accelerating or retarding the pivoting movement in conformity with the impulse brought about by the scanning operation. The control of the pivoting speed can be so adjusted that the speed v will, when the bucket wheel enters the previously scanned slope profile section, have precisely that value which in conformity with the scanning operation is required in order to be able with the given contour of the slope profile section to realize the quantity Q per time unit which is to be kept constant.

FIG. 3 illustrates how on the basis of the relatively steep profile 13 it is possible via a corresponding short pivoting stroke a to reduce the pivoting speed v. When the profile of the mass of bulk or movable material slopes less steeply in the direction of pivoting movement, for instance according to the profile 26, the reduction in the pivoting speed v is effected over a longer pivoting stroke b.

When the bucket wheel beam is pivoted in a direction opposite to the direction indicated by the arrow 2, the scanning device on frame 7 becomes effective.

With a bucket wheel dredge, the scanning devices operate fundamentally in the same manner as with a bucket wheel loader. In both instances, the scanning devices may, preferably in block operation, serve to bring about a reversal of the pivoting movement of the boom at the end of a crescent section. To this end, advantage may be taken of the fact that at the tip of the crescent in conformity with FIG. 5 the feelers are moved outwardly to the greatest extent so that the adjusting member 23 is located outside the range proper for the control of the pivoting speed. In this particular situation, for instance through contact 25, an impulse may be initiated for reversing the pivoting motor.

There also exists the possibility of adjusting the conveyor output Q which is to be held constant by the feeling device for different values. Such an adjustment depends on one hand on the respective property of the material to be picked up and on the other hand on the quantity to be conveyed per time unit by the conveyor installation which follows the bucket wheel loader or bucket wheel dredge.

FIG. 5 illustrates, in dot-dash lines, a diagram representing a reduced conveyor output per time unit. With one and the same adjustment of the adjusting member 23 which corresponds to a certain cross section F of the cut, a lower pivoting speed v has been selected than in conformity with the full line diagram.

The invention is, of course, also applicable when the bucket wheel is replaced by other means, such as a bucket chain. Furthermore, a device according to the present invention may instead of being used for pick-up implements also be used for unloading implements, and also for combined pick-up and unloading implements.

The employment of the invention in connection with such a combined implement is illustrated in FIG. 11. In this arrangement, the feelers of the scanning device are indicated by beams 28 starting at the axis 10 of rotation of the bucket wheel 3 and located in a plane to which the direction of the pivoting speed of boom 1, coincidings with direction of the axis 10, is perpendicular. Mounted on boom 1 in a manner known per se is a reversible conveyor belt 29 which is adapted during a pick-up operation to convey the material picked up by the bucket wheel 3 to the pivoting center of the implement. Belt 29 extends beyond the bucket wheel 3 and is adapted during the unloading operation to convey in an opposite direction so that the conveyed material is discharged over reversing drum 30 onto the mass or pile 31.

As will be evident from FIG. 11, during unloading operations, the feeler beams 28 are extended beyond the cutting circle 15 of the bucket wheel. The feeler beams 28 run ahead of conveyor belt 29 during the pivoting movement of boom 1 and accordingly feel the profile 32 of the pile 31 at an area onto which the belt 29, after a certain pivoting movement of the boom has been effected, will unload material from said belt. The scanning device will initiate impulses of such a type that the pivoting speed will be decreased in accordance with the deeper the profile 32 is located below the profile 33 intended with the unloading operation, and vice versa. In this way it is possible to assure that without changing the quantity of bulky or movable material delivered per time unit by belt 29 and discharged from said belt, a predetermined quantity of material will be unloaded and piled up in conformity with the definite profile 33, even if the profile of the pile as indicated in FIG. 11 by the dot-dash line 34 should have irregularities.

When changing from unloading operation to pick-up operation, the scanning device is so adjusted that the feeler beams 28 substantially cover only the range defined by the cutting circle 15. If desired, the feeler beams 28 may be shortened for this purpose.

During the unloading operation, the scanning device may also be employed as a safety device for preventing damage which could be caused when the unloading boom during a pivoting operation would hit a bulge of the mass or pile not seen by the operator. In such an instance, the feelers would first hit the bulge and accordingly would be turned to a considerable extent whereby an impulse for turning off the pivoting operation for the advancing operation for the implement would be initiated. It is also possible to produce an impulse for lifting the discharge boom so that the latter will be lifted out of the danger area.

Also with the bucket wheel operation in case of an overdischarge, the scanning device may be employed automatically to turn off the pivoting operation or the drive for the implement.

The scanning device may be designed in various ways. With a bucket wheel implement, the feelers need not necessarily be arranged radially with regard to the axis of rotation of the bucket wheel. Instead, similar to other devices, different possibilities of movement may be provided for the feelers. It is merely necessary that the feelers will be able to ascertain the contour of the profile of the respective slope section.

The scanning device need not be equipped with mechanical feelers. Instead, the contour of the profile may be scanned by means of beams 28 or rays indicated in FIG. 11, as for instance ultrasound waves, electromagnetic oscillations, or photoelectric cells. In such instances, the scanning device will be equipped with corresponding beam emitters and receivers. For instance a plurality of emitter-receiver pairs may be provided for as many points as possible of the profile section, and the impulses obtained for the individual points may be integrated. It is, however, also possible to employ one emitter only and to move the same in such a way that the emitter beam passes over the profile and is conveyed to a correspondingly moved receiver. With a bucket wheel implement, the emitter and the receiver are advantageously rotated about the axis of rotation of the bucket wheel. In this way, all of the points of the profile section are successively covered in a very short time and the thus obtained impulses are integrated. In this way the number of emitters and receivers is considerably reduced, and the profile is covered more precisely. It is also possible to employ two or more emitter-receiver pairs of which one pair each is associated with a partial section of the profile.

When employing mechanical feelers, these feelers are preferably by returning means (not shown) for instance springs, returned to their starting position. Thus, the arms 8 may in this way be returned to the position shown in FIG. 3 in full lines. The integration of the values ascertained by the respective individual feelers may be effected not only hydraulically but also in any other way, as for instance electrically or mechanically.

What we claim is:

1. In combination with an implement operable to handle material goods, especially a transloader and a dredge, which has handling means for handling material goods and is movable along the slope of a mass relative to which material goods are optionally removable and accumulatable: scanning means supported by said implement so as to move ahead of said handling means for probing the contour of said slope of the mass along which said handling means is about to move and for registering the deviation of the probed slope contour from a desired slope contour, and control means operable in response to said deviation to vary the speed of movement of said handling means in such a manner that the implement will operate with a uniform output of material goods.

2. An arrangement in combination according to claim 1, in which said handling means is a bucket wheel, and in which said scanning means is operable to ascertain comparison of the cross-section defined by the probed slope contour section and the desired slope contour section for a desired height as well as the compensate for deviation therebetween by effecting corresponding operation of said control means to vary the speed of movement of said bucket wheel relative to the mass of material goods.

3. An arrangement in combination according to claim 2, in which in response to a very slight difference between the scanned slope contour and the desired slope contour said scanning means is operable to convey impulses to said control means for causing said handling means to carry out operation corresponding to varying speed movements to assure a constant and uniform output of material goods.

4. An arrangement in combination according to claim 1, in which said scanning means includes arms tiltably supported therewith and adapted to contact the slope of which the contour is to be probed, said arms being tiltable in conformity with the contour of the slope being probed thereby in a direction opposite to the direction of movement of said handling means, and means operatively connected to said arms and said control means for actuating the latter in response to and in conformity with minimum tilting movement of said arms.

5. An arrangement in combination according to claim 1, in which said scanning means includes beam emitter and receiver means for respectively ascertaining the distance between a point fixed relative to said handling means and points of the slope contour section to be scanned.

6. An arrangement in combination according to claim 1, in which said scanning means includes means for successively probing a series of points of the slope contour section to be subjected to operation of said handling means.

7. An arrangement in combination according to claim 1, in which said implement is a combined unloader and loader for material goods, and in which said scanning means is adjustable selectively for loading and unloading operation of said implement.

8. In combination with an implement which is a combined unloader and loader operable to handle material goods, especially a transloader and a dredge which has handling means including a bucket wheel for handling material goods and is movable along the slope of a mass of material goods: scanning means adjustable selectively for loading and unloading operation of said implement and supported by said implement so as to move ahead of said handling means for probing the contour of the slope of the mass along which said handling means is about to move and for registering the deviation of the probed slope contour from a desired slope contour and in which the scanning range of said scanning means is adapted to be increased beyond the cutting circle of said bucket wheel when changing from pick-up operation to unloading operation, control means operable in response to said deviation to vary the speed of movement of said handling means, and means associated with said scanning means and operable when changing from unloading to pick-up operation to permit actuation of said control means only after the range of action of said scanning means has been reduced to within the cutting circle of said bucket wheel.

9. An arrangement in combination according to claim 8, in which said handling means including said bucket wheel has a particular circle of movement with respect to the material goods being handled, a closed-loop continuous conveyor for transferring the material goods, said scanning means being adapted to move ahead of said bucket wheel and ahead of said conveyor in advance location for probing the contour of said slope along which said bucket wheel and said conveyor are about to move and registering the deviation of the probed slope contour from a desired slope contour, and said control means operable in response to said deviation varies the speed of movement of both said bucket wheel and said conveyor in such a manner that the implement will operate with a uniform output of material goods, said scanning means being adapted to extend beyond the circle of movement of said bucket wheeel when changing from operation in which the material goods are removable to operation in which the material goods are accumulated, and means associated with said scanning means and operable when changing operation from being accumulatable to being removable with respect to the material goods to permit actuation of said control means only after operating range of said scanning means has been reduced to within the circle of movement of said bucket wheel.

References Cited

UNITED STATES PATENTS

| | | | |
|---|---|---|---|
| 2,221,396 | 11/1940 | Evoy | 198–37 |
| 2,639,569 | 5/1953 | Pasturczak | 56–20 |
| 3,064,357 | 11/1962 | Butters. | |
| 3,196,599 | 7/1965 | Meiners et al. | 56–11 |
| 3,223,964 | 12/1965 | Stadlin | 198–37XR |
| 3,258,865 | 7/1966 | Andorf | 37—190 |

WILLIAM B. PENN, Primary Examiner

C. D. CROWDER, Assistant Examiner

U.S. Cl. X.R.

172—2; 173—4; 198—36, 37, 40; 299—1